United States Patent [19]

Sillars

[11] 4,093,113
[45] June 6, 1978

[54] SEAM SOLDERING MECHANISM

[75] Inventor: Frederick Stirling Sillars, Beverly, Mass.

[73] Assignee: USM Corporation, Farmington, Conn.

[21] Appl. No.: 766,779

[22] Filed: Feb. 8, 1977

[51] Int. Cl.² ............................ B23K 1/16; B23K 3/06
[52] U.S. Cl. ........................................ 228/36; 228/43
[58] Field of Search ...................... 228/33, 35, 36, 43, 228/256, 22, 23; 219/64

[56] References Cited

U.S. PATENT DOCUMENTS

| 1,884,842 | 10/1932 | Peters | 228/36 |
| 1,956,344 | 4/1934 | Coyle | 228/23 |
| 2,597,893 | 5/1952 | Nordquist | 228/43 |
| 2,900,944 | 8/1959 | Eastman et al. | 228/256 |
| 3,190,528 | 6/1952 | Sillars | 228/43 |

Primary Examiner—James L. Jones, Jr.
Assistant Examiner—K. J. Ramsey
Attorney, Agent, or Firm—Carl E. Johnson; Richard B. Megley; Vincent A. White

[57] ABSTRACT

Mechanism for soldering seams, especially the side seams of moving "tin" can bodies, comprises means for guiding each seam along a path, an applicator rotatable counter to the direction of can seam travel and having one portion immersed in molten solder and another solder wettable portion not so immersed, the other portion including a solder applying rim in substantially tangential relation to a locality of the seam joint in the path, and means for maintaining an atmosphere of inert gas about the non-immersed applicator portion and the mentioned locality to avoid oxidation of the solder as applied at the joint and also while carried thereto by the applicator.

2 Claims, 6 Drawing Figures

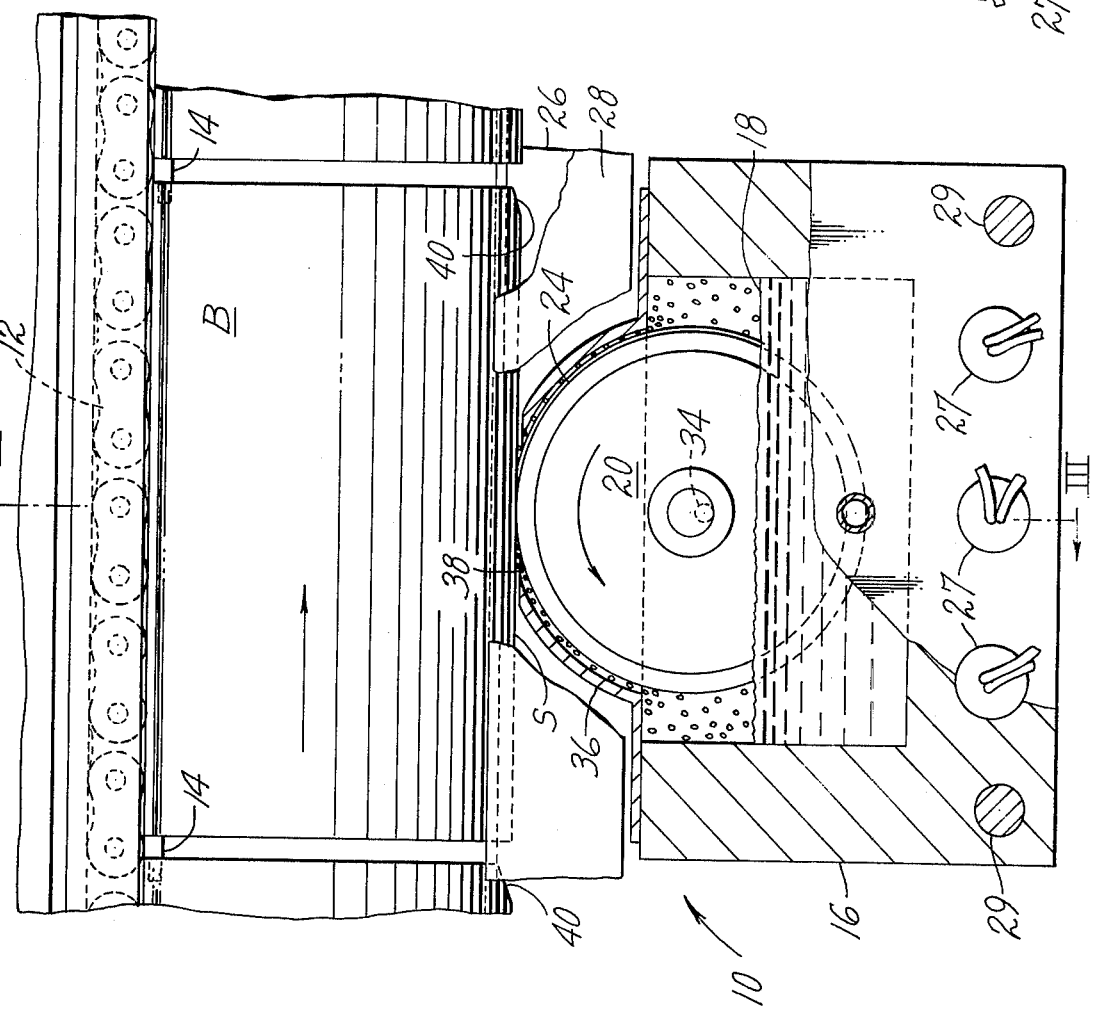

SEAM SOLDERING MECHANISM

BACKGROUND OF THE INVENTION

The present invention is particularly concerned with the provision, especially in a can making machine, of improved joint soldering mechanism but it will be recognized that application of the invention is not limited to side seams nor even necessarily to cans of any particular configuration.

Side seam soldering of cans has been disclosed, for example, in U.S. Pat. Nos. 3,255,945; 3,370,772; 3,371,837; 3,371,838; 3,371,839 and 3,384,286. In general, the can making details and arrangements described therein have received good commercial acceptance. They involve feeding of cylindrical can bodies with their side seams in a predetermined path, and the application of molten solder to the joint of each seam as it progresses.

In U.S. Pat. No. 3,190,528 there is disclosed an applicator nozzle having a discharge orifice for applying solder to a seam groove, and a V-guide for riding in the groove to restrict can movement during the soldering. One approach to the problem of dealing with impurities such as solder oxides and slag in the molden solder to be fed from a reservoir and through a nozzle is described in the above-mentioned U.S. Pat. No. 3,371,837. Another approach seeking to prevent flux-caused clogging of a soldering nozzle orifice is taught in the referenced U.S. Pat. No. 3,371,838. The teaching of the latter, by a gaseous (air or otherwise) enveloping of the applicator orifice and the solder streaming therefrom, attempts to avoid orifice restriction and blockage. Thus, though the general desirability of preventing solder oxidation and joint contamination has been known for some time, no entirely satisfactory solution to the problem has as yet been developed, so far as known.

Looking further back in the prior art, it is also noted that an old system (sometimes still used) which included conveyorized movement of can bodies to be side seam soldered also included, usually between means for preheating the interlocking seam edges and means for afterheating their soldered joint, a solder bath wherein an applicator roll having an undulating circumferential surface transferred molten solder to the seam joint as the roll surface moved transversely of the joint, i.e. across the direction of travel of the side seams. In such earlier systems it was customary to provide, downstream of the after-heat section, a cloth-covered buffing roll for wiping off excess solder. Since the applicator undulations were intended to, and did, work across the seam at several points thus attempting to force surplus solder into the opening between the seam plies, the wiping roll operating in air subsequently usually oxidized the solder setting up in the joint as well as removed bits of the excess and oxidized solder.

SUMMARY OF THE INVENTION

In view of the foregoing, it is an object of this invention to provide an improved applicator arrangement for transferring from a pot, molten solder to be deposited along a seam joint and having associated means for maintaining all exposed portions of the applicator, as well as its solder to be deposited along the locality of its contact or near-contact with the joint, in an inert or de-oxidizing atmosphere.

Another object of the invention is to provide a side seam soldering station in a conveyorized can making machine, which station shall avoid the potential for orifice clogging or restriction encountered when passageways direct a jet flow of molten solder.

A further object of this invention is to eliminate, in a can side-seaming machine wherein the can bodies are moved in a row and spaced end-to-end, the need for a wheel (or an equivalent seal means) hitherto required, when nozzle applicators were used, for bridging adjacent ends of successive side seams to shut out unwanted solder deposit from an applicator.

To these and other ends the present invention features the provision of at least one transfer roll rotatably driven, while partly immersed in a solder bath, to carry the solder wetting the rim of the roll progressively along and directly into the opening of the seam, for instance a can side seam, the direction of rotation of the roll preferably being counter to the seam travel.

In accordance with a further feature of the invention there is associated with the transfer roll a means for maintaining about all non-immersed portions of the roll, as well as the locality of the seam joint which is longitudinally receiving the molten solder, an atmosphere of gas, preferably a low pressure anti-oxidation medium such as one of nitrogen or a de-oxidizing agent.

Another feature of the invention resides in so mounting one or more of the novel applicator rolls that a portion of its upper rim is not merely in continuous tangential relation to opposite, counter-moving longitudinal edges of the seam opening, but is or may be disposed to bear progressively along one edge (or when desired, both edges) of the seam entry better to work it and effect solder penetration by positive pressure at the nip of the roll.

BRIEF DESCRIPTION OF THE DRAWINGS

The foregoing and other features of the invention will now be more particularly described in connection with a preferred embodiment, and with reference to the accompanying drawings thereof, in which:

FIG. 2 is a view on an enlarged scale of a soldering station of FIG. 1 with portions broken away to reveal construction, including a solder transfer wheel;

FIG. 3 is a section taken on the line III—III of FIG. 2;

DESCRIPTION OF THE PREFERRED EMBODIMENT

Figure 1:
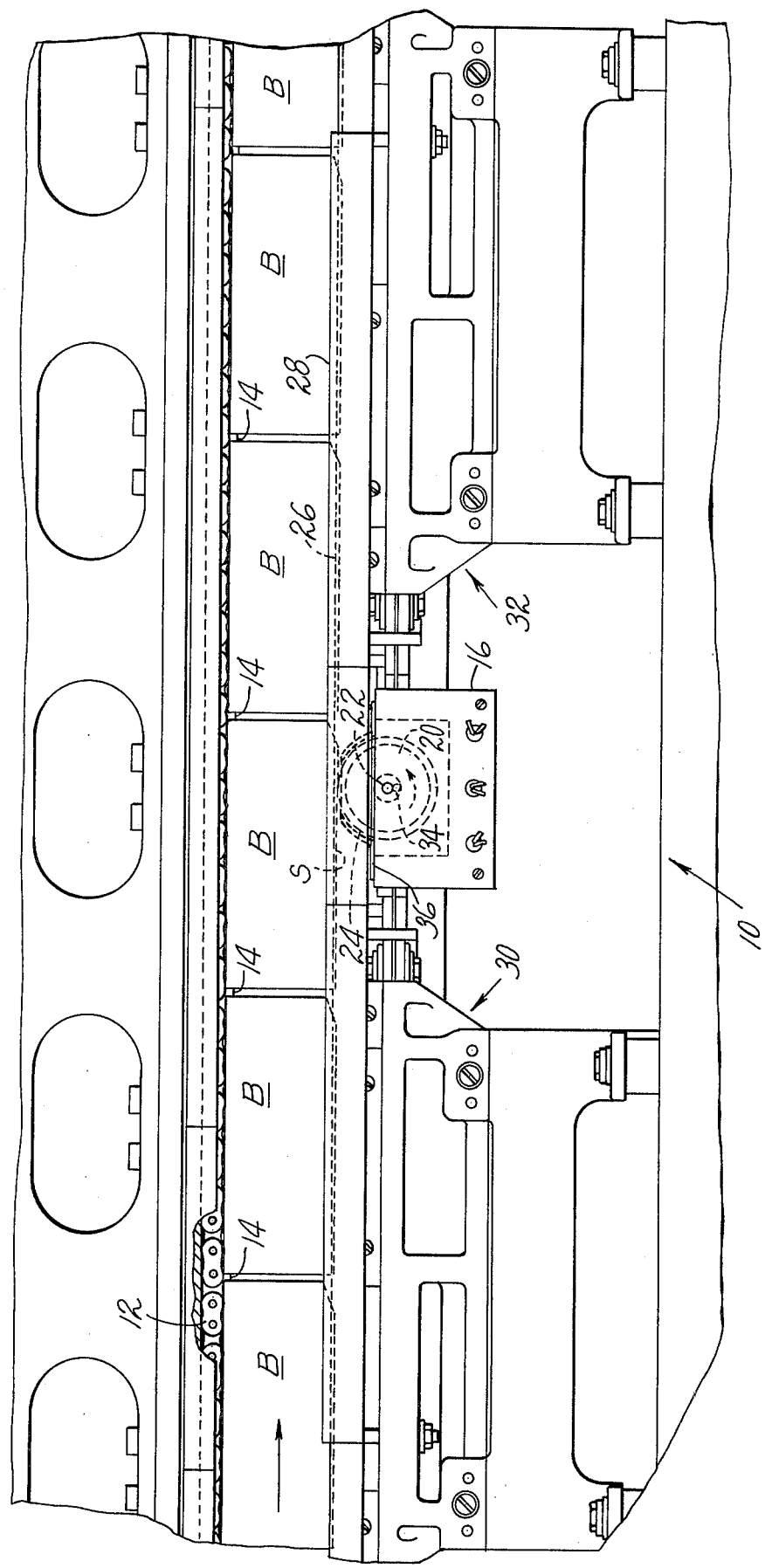
FIG. 1 is a view in side elevation of a can body soldering machine embodying the invention.

Referring to FIG. 1, successive can bodies B herein shown as open ended and cylindrical, that are assumed to have been formed with interlocking side seams S (FIGS. 2-5) in a conventional body making machine (not shown) are fed from left to right in a timed and substantially coaxially spaced relation to have their side seams soldered. It will be understood that, for present purposes relating primarily to disclosure of a novel soldering station generally designated 10 and hereinafter to be more fully described, the can moving means used may be of different structural forms and detail without departing from the scope of this invention but, for convenience and simplicity in illustration, is herein assumed to generally correspond with the conveyor disclosed in the U.S. Pat. No. 3,384,286 issued in 1968 in my name. Accordingly, an endless chain 12 with feed dogs 14 (FIG. 13) located at predetermined intervals has its upper reach moving to the right, each dog being engageable with the trailing edge of a can B to push it along a path and through the station 10. Unlike the disclosure of the U.S. Pat. No. 3,384,286, the spaces between adjacent can ends need not now be equal to the length of the dogs 14.

Figure 4:
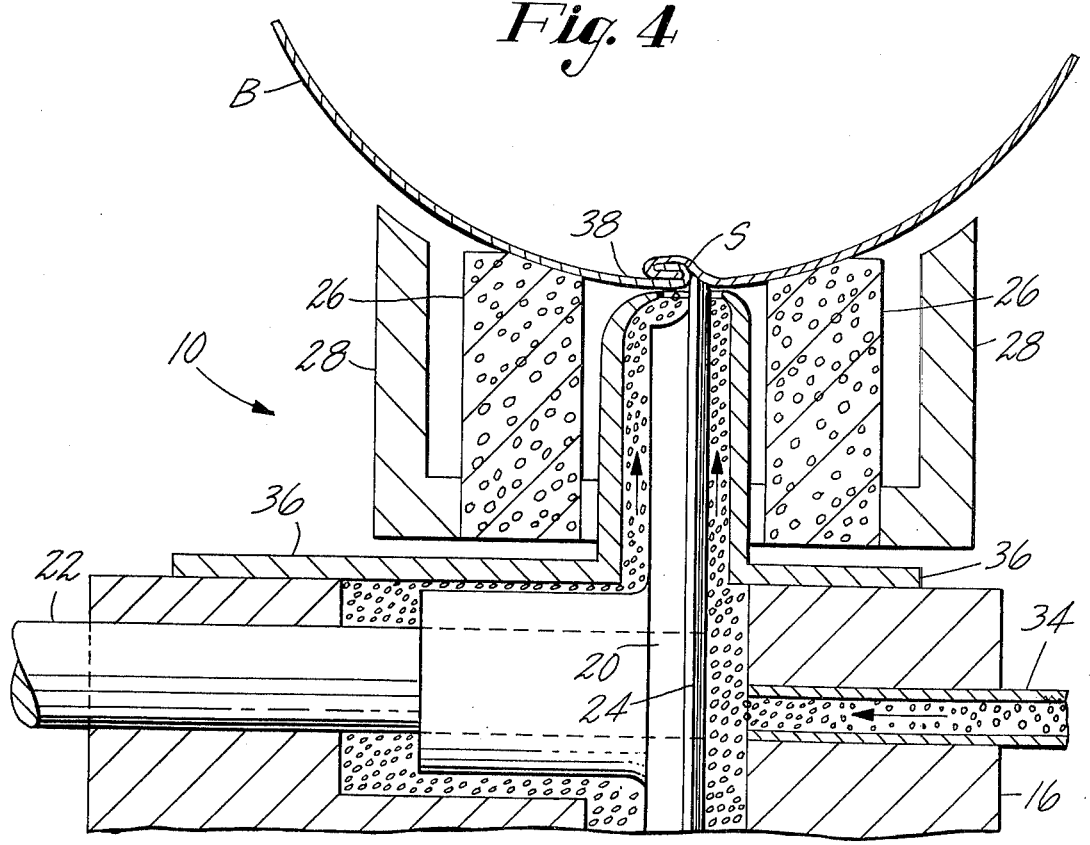
FIG. 4 is a view on a larger scale of a portion of the soldering mechanism shown in FIG. 3.

The soldering station 10 comprises a pot 16 (FIG. 14) containing molten solder 18 the surface level of which is desirably maintained within preset limits by control means not herein shown. A disk-like solder transfer wheel or roll 20 is mounted on a rotary drive shaft 22 which may be journalled in a wall of the pot 16, the arrangement being such that the lower portion of the roll is immersed in the solder bath and the upper portion of the roll is not so immersed. Thus, outer rim 24 of the roll rotates counter-clockwise as shown in FIG. 2 and preferably in the counter or opposite direction to the feeding movement of the cans B. As shown in FIGS. 3 and 4, the circumference of the roll is aligned axially and substantially tangentially with the advancing seams S. For guiding the cans in alignment, spaced coaxially extending, vertically adjustable conveyor rails 26,26 at opposite sides of the station are employed. Generally, as heretofore, the rails 26 in the vicinity of the station are of ceramic, since they usually extend between a seam preheating station not shown and an after-soldering seam heating station also not shown. Also extending adjacent to the rails and lengthwise through the station is a pair of heating units 28,28, one on each side of the seam path, to insure that solder wetting the rim 24 as well as that which has been impelled by the rim into the seam joint is maintained at a temperature above the solder melting point. Heaters 27 (FIGS. 1,2) controlled by thermostats 29 appropriately maintain the temperature of the liquid solder 18 in the pot 16.

Preferably a seam preheating zone, indicated at 30 (FIG. 1) is provided just ahead of the station 10 to raise seam temperature slightly above the solder melting point (usually about 619° F). A post heating zone shown at 32 (FIG. 1) desirably extends just downstream from the station 10 subjecting the soldered seams to higher temperature, usually on the order of 650° – 700° F maximum, thus facilitating penetration of the solder delivered by the applicator rim 24 progressively to the entrance of the seam joint.

To insure a continuous supply of uncontaminated solder for wetting the rim 24 of the applicator roll, a flow of inert gas, such as nitrogen or other gaseous anti-oxygen or deoxidizing agent, is introduced into the pot 16 above the liquid solder level by means of a conduit 34 (FIGS. 2–4). Not only does the nitrogen (or other assisting atmosphere) prevent the formation of dross which would adversely coat the applicator roll 20, but it aids the rim 24 to be wetted by the solder in the pot and/or being transferred to the seam joint and acts to guard against oxidation of the latter. For this purpose, a hood or cover 36 mounted on the pot 16 is shaped to enshroud the upper portion of the rim 24 and thus maintain all non-immersed portions of the applicator roll in a suitable atmosphere, such as one of nitrogen. An outlet opening 38 (FIG. 4) formed in the cover 36 surrounds the locality of tangency of the rim 24 with each passing seam S. Preferably, during operation of the machine, the nitrogen (for instance) is continuously supplied via the conduit 34 under pressure just sufficient to exclude air from the pot, the exhaust stream of nitrogen being emitted through the opening 38 in a manner to envelope the solder as it is progressively applied lengthwise of the seam joint by the rim 24.

Figure 6:
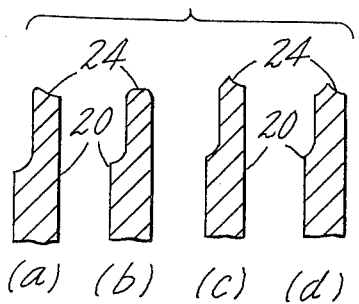
FIG. 6 illustrates some alternative shapes of the applicator rim useful for transferring solder into solder joints.

It will be understood that, as illustrated in FIG. 6, different contours (as illustrated in forms, *a, b, c & d*) may be provided in the applicator rims 24 as appropriate to the different seam joints which are to be soldered thereby. This selection of contour may be predicated for instance, in part on the size or "stiffness" of a can to be soldered, the metal from which it is made, any variant in solder alloys employed, selected rotation speed of the roll 20, or nature of the can seam, etc. Also, it should be noted that in some applications rather than operate the applicator roll with its rim 24 spaced for very light tangential contact progressively with the edge or edges of a side seam opening, it may be advantageous to cause the rim to bear on each seam joint progressively with sufficient pressure to work it and thus force the delivered solder to penetrate between the interlocking seam edges as they progress.

Operation of the soldering station 10 will now be reviewed. The side seam S of each can body B in moving from right to left, as in FIG. 2, has its joint or seam opening progressively in tangential relation to the rim of the counter-clockwise rotating roll 20. As its rim 24 becomes wet with solder by immersion therein, the picked-up solder is continuously delivered into and along the successive seams. The continuous flow of antioxidation gas, such as nitrogen, through the enclosure defined by the cover 36 and the pot 16 above the solder surface inhibits dross formation either on the applicator roll or on the solder in the pot or being applied to the can seam. On circumferential portions of the roll progressively arriving at the locality of tangency with each preheated seam joint, the rim 24 forces the picked-up solder to be wiped into the seam and a capillary action occurs to further induce the solder into the seam joint.

Figure 5:
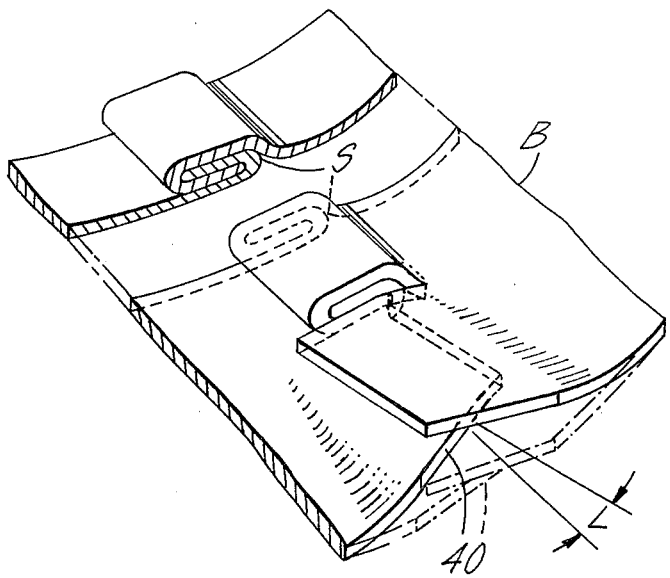
FIG. 5 is a fragmentary perspective view of a can side seam showing its conventional anti-solder scoop portion.

Relative movement of the applicator rim 24 and each can seam insures that the solder deposited will have substantially filled the seam joint and left a fairly smooth solder surface at the former seam opening. The leading end of each side seam S is preferably formed with an anti-solder scoop portion, such as is shown at 40 in FIGS. 2 and 5, wherein overlapping body edges 42,44 are bent inwardly at a taper having a small angle L (FIG. 5). This, or some equivalent can body formation, insures that even at high speed can seaming no sealing means is required between adjacent seam ends when they transverse the applicator roll 20.

It will be appreciated from the foregoing that a soldering station of uncomplicated construction and reliable operation is provided by the invention.

Having thus described my invention, what I claim as new and desire to secure as Letters Patent of the United States is:

1. Mechanism for soldering seams of cans and the like comprising, in combination with means for guiding and moving the cans in one direction along a path with their seams in predetermined orientation, an applicator roll movable in the path of seam travel counter to said one direction and having one portion which, during operation of the mechanism, is arranged to pass through a bath of molten solder and thence through an anti-oxidation or de-oxidizing atmosphere to present another previously solder-wetted applicator roll portion in substantially continuous tangential relation progressively along the length of the joint of each seam, the roll being disc-like and having a rim formed to substantially correspond in width with the openings of the respective seam joints, a single means for enshrouding the bath and the wetted portion in said atmosphere, and a drive shaft for the roll driven independently of the can moving means and extending transversely of and beneath said path, the shaft being substantially horizontal and journaled heightwise between said can guiding means and the surface level of the solder bath to cause an upper portion of the roll rim to engage and wipe opposite entrance edges of the seam joints progressively and thereby apply a positive pressure causing the solder being transferred by the rim to penetrate into each seam joint.

2. Mechanism as in claim 1 wherein the relative heightwise positions of the shaft axis of rotation and said can guiding means is selected to cause the rim of the applicator roll to compress each can diametrically as the solder is being transferred to its seam joint thereby working the seam and causing the flux vapors to be ejected therefrom ahead of the entering solder.

* * * * *